United States Patent [19]

Stokes

[11] Patent Number: 4,488,745
[45] Date of Patent: Dec. 18, 1984

[54] SUPPORTS FOR PLASTIC MOTOR VEHICLE BUMPERS

[75] Inventor: Vijay K. Stokes, Schenectady, N.Y.

[73] Assignee: General Electric Company, Schenectady, N.Y.

[21] Appl. No.: 481,620

[22] Filed: Apr. 4, 1983

[51] Int. Cl.³ .............................................. B60R 19/02
[52] U.S. Cl. ..................... 293/155; 403/267; 403/220; 29/458; 29/526 R; 293/122
[58] Field of Search ............... 293/120, 121, 122, 129, 293/132, 133, 155 O; 403/267, 266, 220; 29/458, 526 R

[56] References Cited

U.S. PATENT DOCUMENTS

| | | | |
|---|---|---|---|
| 3,850,466 | 11/1974 | Yepis | 293/89 |
| 3,905,630 | 9/1975 | Cantrell | 293/98 |
| 3,927,907 | 12/1975 | Bialek | 293/71 |
| 4,003,594 | 1/1977 | Tommeraas | 293/84 |
| 4,018,299 | 4/1977 | Nagin et al. | 180/91 |
| 4,061,384 | 12/1977 | Montgomery et al. | 293/71 |
| 4,192,538 | 3/1980 | Gulli | 293/134 |
| 4,193,621 | 3/1980 | Pelchi et al. | 293/142 |
| 4,252,355 | 2/1981 | Groupy et al. | 293/120 |
| 4,272,115 | 6/1981 | Stock | 293/155 |
| 4,408,790 | 10/1983 | Shimoda et al. | 293/122 |
| 4,427,189 | 1/1984 | Kimura et al. | 293/136 |

*Primary Examiner*—Robert R. Song
*Attorney, Agent, or Firm*—Mark L. Mollon; James C. Davis, Jr.; Marvin Snyder

[57] ABSTRACT

A plastic support for attaching a plastic bumper to the metal frame of a motor vehicle comprises a metal pad having means for attaching the pad to the metal vehicle frame. The means for attaching the pad extends from, and is affixed to, one face of the pad. The pad is completely embedded in a moldable thermoplastic matrix except where the means for attaching the pad to the metal vehicle frame extends through the matrix. The matrix adjacent the other, or opposite, face of the pad is affixed to the plastic bumper, forming a plastic-to-plastic joint.

7 Claims, 8 Drawing Figures

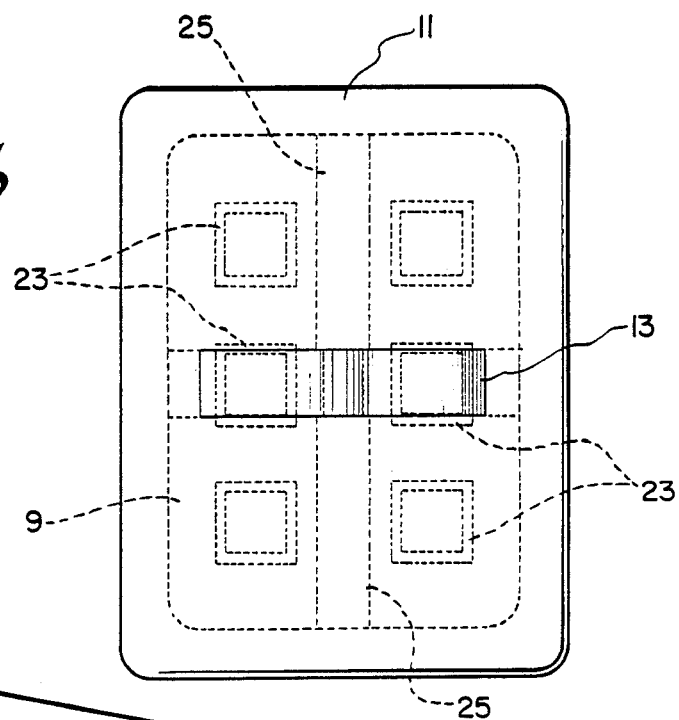
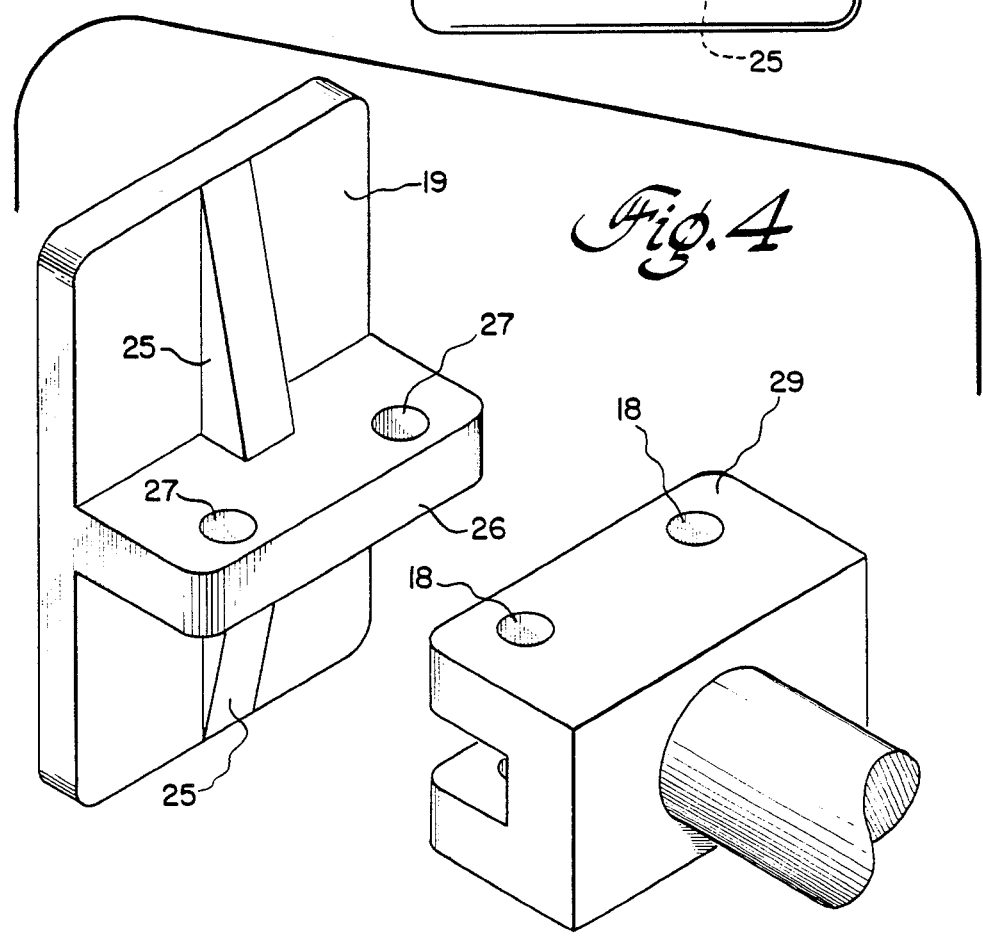

SUPPORTS FOR PLASTIC MOTOR VEHICLE BUMPERS

BACKGROUND OF THE INVENTION

This invention relates to plastic vehicle bumpers and more particularly to supports for attaching plastic bumpers to the steel struts of a motor vehicle frame.

Currently attachment of plastic bumpers to the body of a motor vehicle, such as an automobile with or without the use of shock absorbers, typically requires use of bolts for attaching the plastic bumper back face to the steel face of the strut extending from the automobile body. This has several disadvantages. First, holes are introduced in a region of high stresses resulting in unnecessary stress concentration in the plastic material. Second, slight variations on the amount of torque applied while tightening the bolt could result in excessive loads on the plastic which, in addition to giving rise to high stresses, could also introduce cracks. Third, such joints cannot be sealed properly and the resulting crevices could act as traps for solvents and other environmental agents that attack the plastic material, resulting in failure due to material degradation. Finally, the current approaches for attachment are cumbersome from the point of view of assembly, probably being based on how metal bumpers are assembled and attached to the supports.

It is an object of the present invention to provide an attachment support for attaching a plastic bumper to the metal frame of a motor vehicle, while avoiding any need for making holes in the plastic bumper.

It is a further object of the present invention to provide a sealed interface between the metal and plastic parts of a plastic bumper at the bumper support to avoid material degradation due to trapped solvents or environmental agents.

SUMMARY OF THE INVENTION

In one aspect of the present invention a plastic support for attaching a plastic bumper to the metal frame of a motor vehicle comprises a metal pad having means for attaching the pad to the metal vehicle frame. The means for attaching the pad extends from, and is affixed to, one face of the pad. The pad is completely embedded in a moldable thermoplastic matrix except where the means for attaching the pad to the metal vehicle frame extends through the matrix. The matrix adjacent the other, or opposite, face of the pad, is affixed to the plastic bumper, forming a plastic-to-plastic joint.

BRIEF DESCRIPTION OF THE DRAWING

While the specification concludes with claims particularly pointing out and distinctly claiming the present invention, the objects and advantages of the invention can be more readily ascertained from the following description of preferred embodiments when used in conjunction with the accompanying drawing in which:

FIGS. 3a and 3b are a side view and rear view, respectively, of another embodiment of a bumper support in accordance with the present invention; and FIG. 4 is a perspective view of one side of an alternative configuration of a metal pad for use in the bumper support of the present invention.

DETAILED DESCRIPTION OF THE DRAWING

Figure 1A:
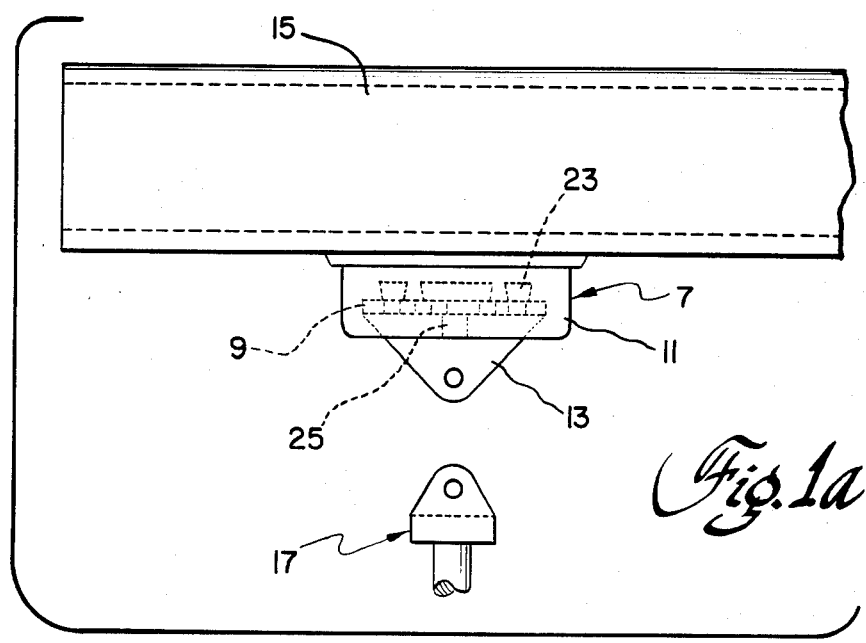
FIGS. 1a, 1b and 1c are a top, rear and section views, respectively, of a bumper support affixed to a plastic bumper (of which only part is shown) in accordance with the present invention.
Figure 1B:
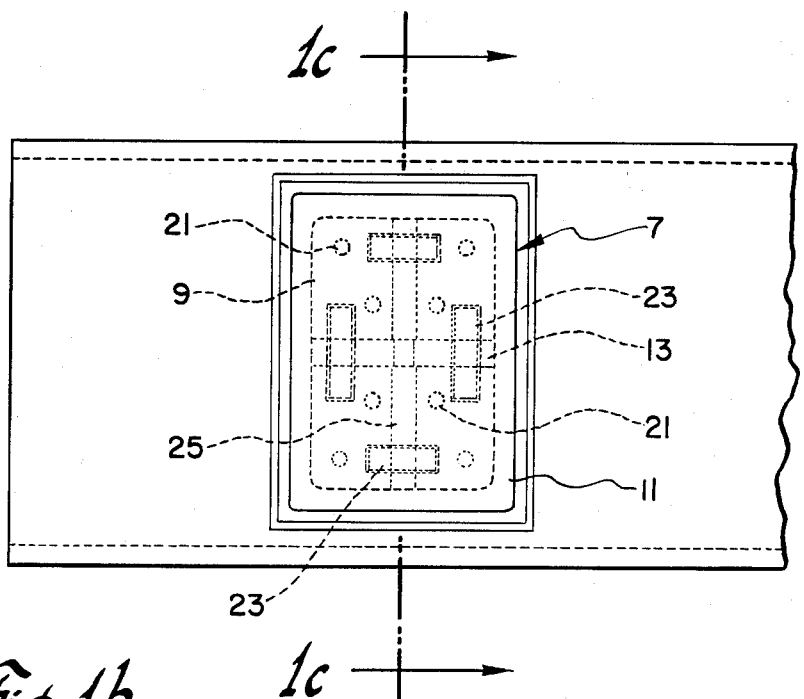
Figure 1C:
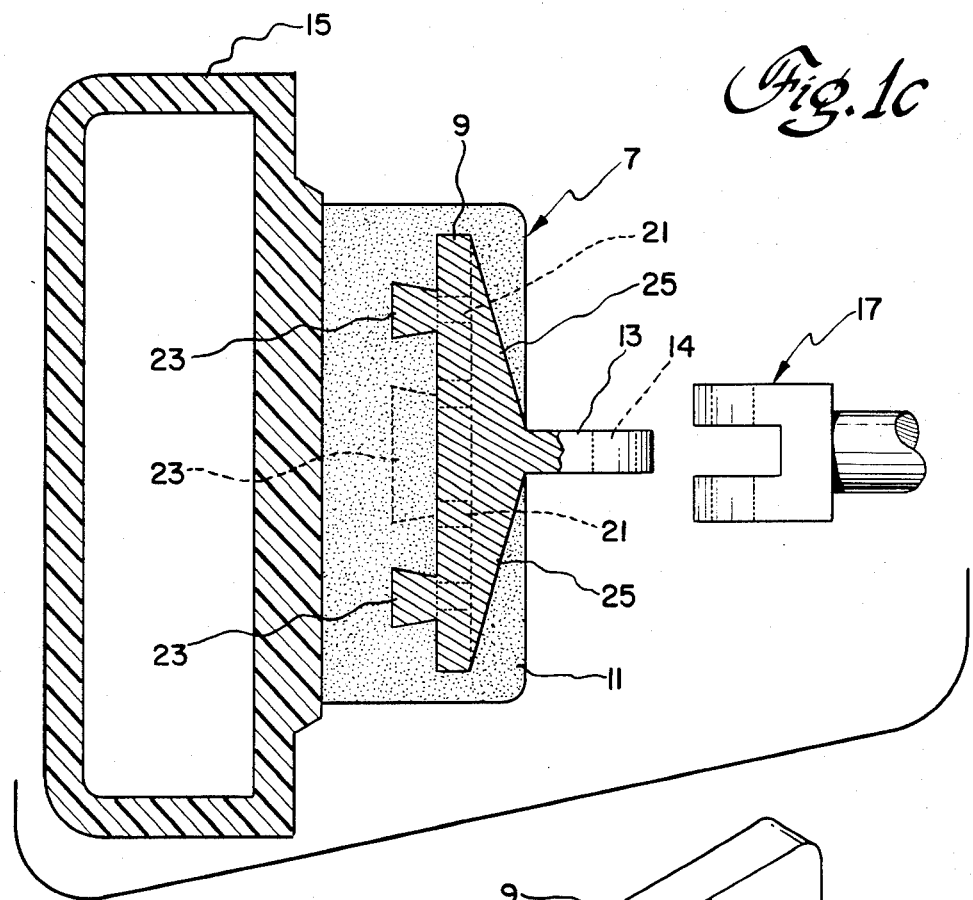

Referring to the drawing and especially FIGS. 1a–1c thereof, a support 7 for a plastic bumper is shown. The bumper support comprises a steel pad 9 embedded in a thermoplastic matrix 11. Extending from the rear face of the pad through the plastic matrix is a tongue or eye 13 having a hole 14. The bumper support 7 is attached to the plastic bumper 15, shown as a box beam bumper. The support 7 can be used with any type of plastic bumper including the double beam bumper shown in my copending application filed on even date herewith, entitled "Double Beam Motor Vehicle Bumpers", Serial No. (RD-14302) and assigned to the same assignee as the subject application. My copending application is hereby incorporated by reference. The bumper support is shown attached to bumper 15 by vibration welding, induction heating (using a conductive insert) or adhesive bonding could also be used. A clevis 17 with a hole 18, shown spaced apart from the eye 13, is part of the vehicle frame (not shown). The clevis, when attached to the bumper support, surrounds the eye 13 and a bolt (not shown) passing through holes 14 and 18 joins the clevis to the eye. Support 7 is a simple support (as opposed to a fixed support) since rotation of the joint in a horizontal plane is permitted.

Figure 2A:
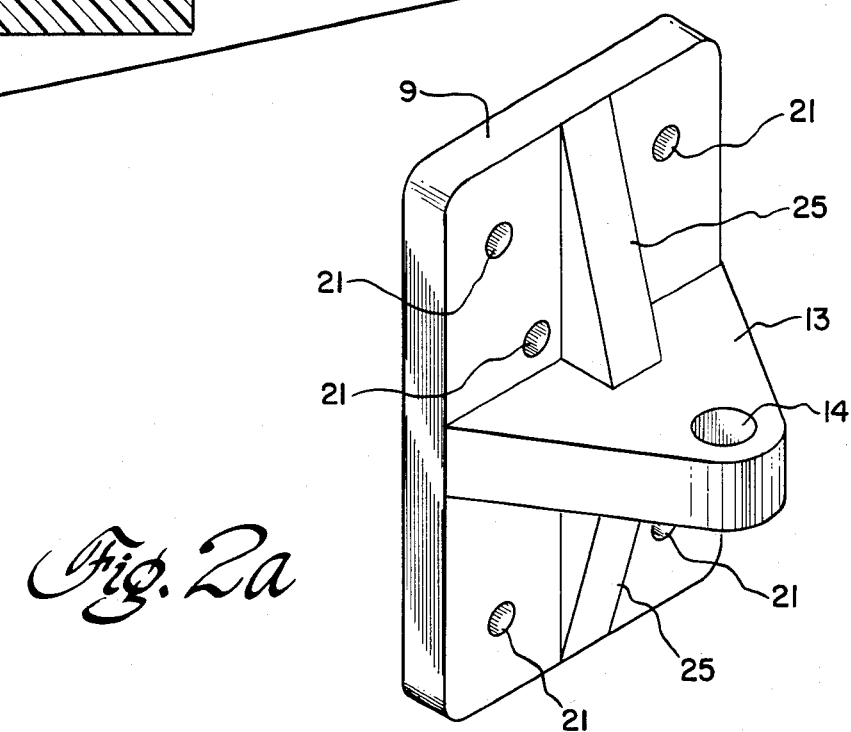
FIGS. 2a and 2b are perspective views of the front and rear faces, respectively, of the metal pad used in the support shown in FIG. 1.
Figure 2B:
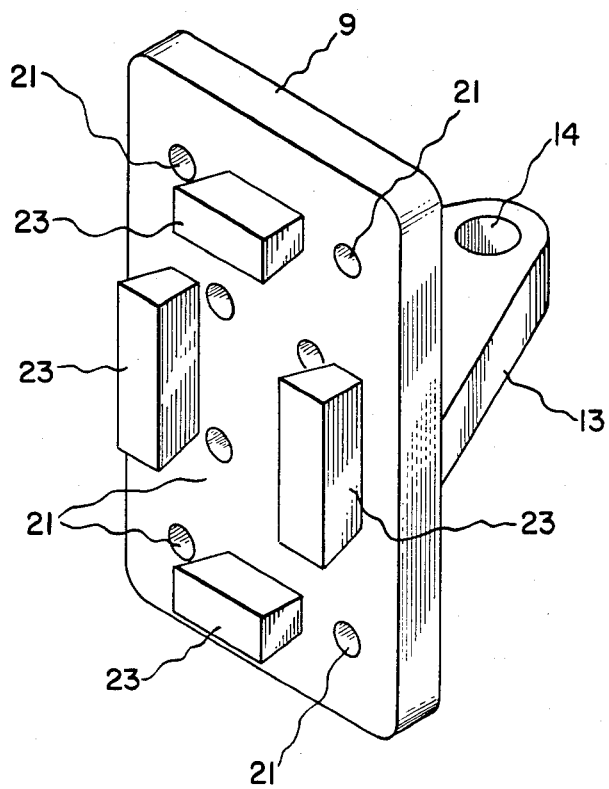

Referring now to FIGS. 2a and 2b the structure of the pad 9 is shown. The pad 9 has a plurality of holes 21 spaced about, and extending from, one face through to the other, permitting the plastic matrix 11 to extend through the pad and reduce any tendency for the plastic matrix to pull away from the pad faces. Dovetail projections 23, most easily seen in FIG. 2b, are spaced about on the front face of pad 9. The dovetail projections 23 also help anchor the plastic matrix to the pad.

Referring to FIG. 2a, the eye or tongue 13 extends perpendicularly from the rear face of pad 9. The tongue typically of steel, can be welded to the rear pad and steel gussets 25 attached to the pad and the eye by welding to reinforce the eye. Steel tongue 13 is partially embedded and gussets 25 are fully embedded in the thermoplastic matrix of pad 9.

Figure 3A:
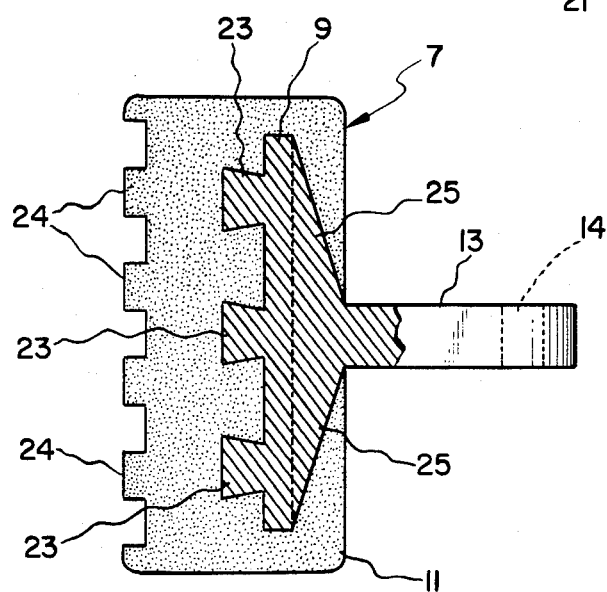

FIGS. 3a and 3b shows another embodiment of a support 7. The plastic matrix 11 includes, on the surface to be affixed to the plastic bumper, a number of raised horizontal ribs 24 running the entire width of the support. The ribs assure good contact during vibration welding of the plastic materials by reducing the effective area of the support contact face. The ribs could alternatively be positioned vertically. Dovetail projections 23 are provided to anchor the matrix to the pad.

FIG. 4 shows a metal pad 19 having a tongue or eye 26 with two spaced-apart holes 27. The corresponding clevis 17 for mounting the support to the metal frame is shown spaced apart from the pad. The pad 19, when used in the support 7 of FIGS. 1, 2 or 3, would provide a rigid fixed support, since the connection of this pad to the vehicle frame does not permit rotation.

The pad of FIGS. 1–4 is embedded in the plastic matrix 11 in a controlled environment so that the metal-plastic interface is sealed to keep out solvents and other corroding agents. The plastic matix could be injection molded, for example, in a cavity containing the pad. Suitable moldable thermoplastics which could be used are polybutylene terephthalate (pbt), polycarbonate resin, and a blend of polyphenylene oxide mixed with rubber-modified polystyrene. The above are available from the General Electric Company, for example, as Valox ®, Lexan ® and Noryl ®, respectively. Alloyed compositions of the above such as pbt and polycarbonate available from General Electric Company as Xenoy TM could also be used.

The foregoing describes a plastic vehicle bumper support that does not require holes to be introduced into the plastic bumper and provides a sealed metal to plastic interface to avoid material degradation due to solvents and other environmental agents that attack plastics that might otherwise become trapped at the interface.

While the invention has been particularly shown and described with reference to several preferred embodiments thereof, it will be understood by those skilled in the art that various changes in form and details may be made without departing from the spirit and scope of the invention.

What is claimed is:

1. A plastic vehicle bumper support attaching a plastic bumper to a metal frame of a vehicle, comprising:
   a pad of metal including means for attaching said pad to said metal vehicle frame extending from and affixed to one face of said pad; and
   a moldable thermoplastic matrix embedding said pad, except where said means for attaching said pad to said metal vehicle frame extends therethrough, the plastic matrix adjacent the other face of said pad being fixed to said plastic bumper and forming a plastic-to-plastic joint with said plastic bumper.

2. The bumper support of claim 1 wherein said pad further comprises dovetail projections extending therefrom to anchor said plastic matrix.

3. The bumper support of claim 1 wherein said pad defines apertures extending between the pad faces to assure good adhesion of said plastic matrix.

4. The bumper support of claim 1 wherein said plastic-to-plastic joint is formed by vibration welding and said plastic matrix adjacent said other face of said pad including a plurality of ribs to assure good contact during vibration welding.

5. The bumper support of claim 1 wherein said means for attaching said pad to said metal vehicle frame comprises a tongue defining an aperture extending perpendicularly from said one face of said pad.

6. The bumper support of claim 1 wherein said means for attaching said pad to said metal frame comprises a tongue defining a pair of spaced-apart apertures extending perpendicularly from said one face of said pad.

7. A plastic vehicle bumper support for attaching to a plastic bumper and to a metal frame of a vehicle, comprising:
   a pad of metal including means for attaching said pad to said metal vehicle frame extending from and affixed to one face of said pad; and
   a moldable thermoplastic matrix embedding said pad, except where said means for attaching said pad to said metal vehicle frame extends therethrough, the plastic matrix adjacent the other face of said pad adapted to form a plastic-to-plastic joint with said plastic bumper.

* * * * *